Aug. 4, 1953
J. B. KUCERA
2,647,795
PLANT SPRAYING MACHINE
Filed Aug. 7, 1948
3 Sheets-Sheet 1
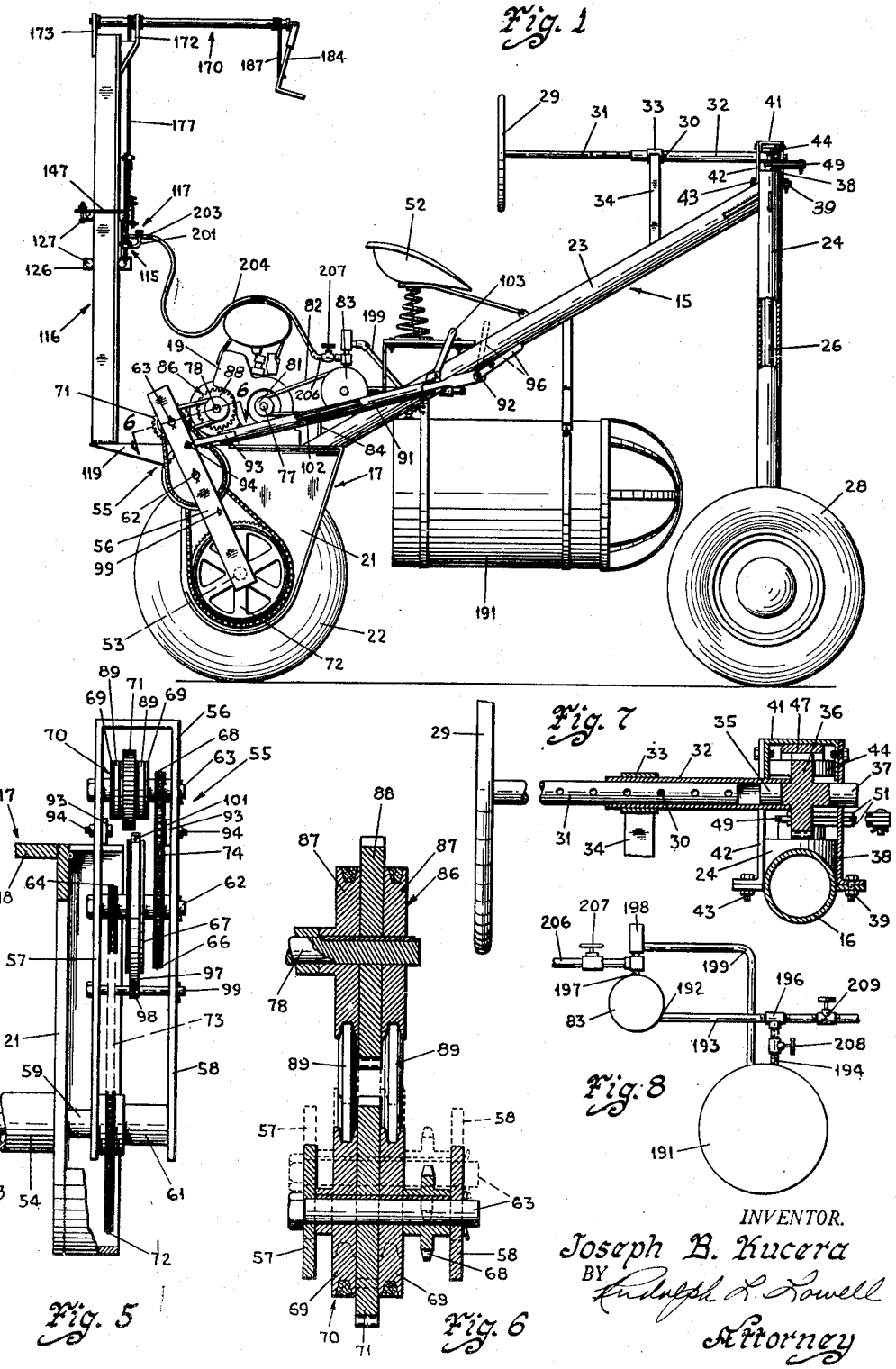
INVENTOR.
Joseph B. Kucera
BY
Attorney

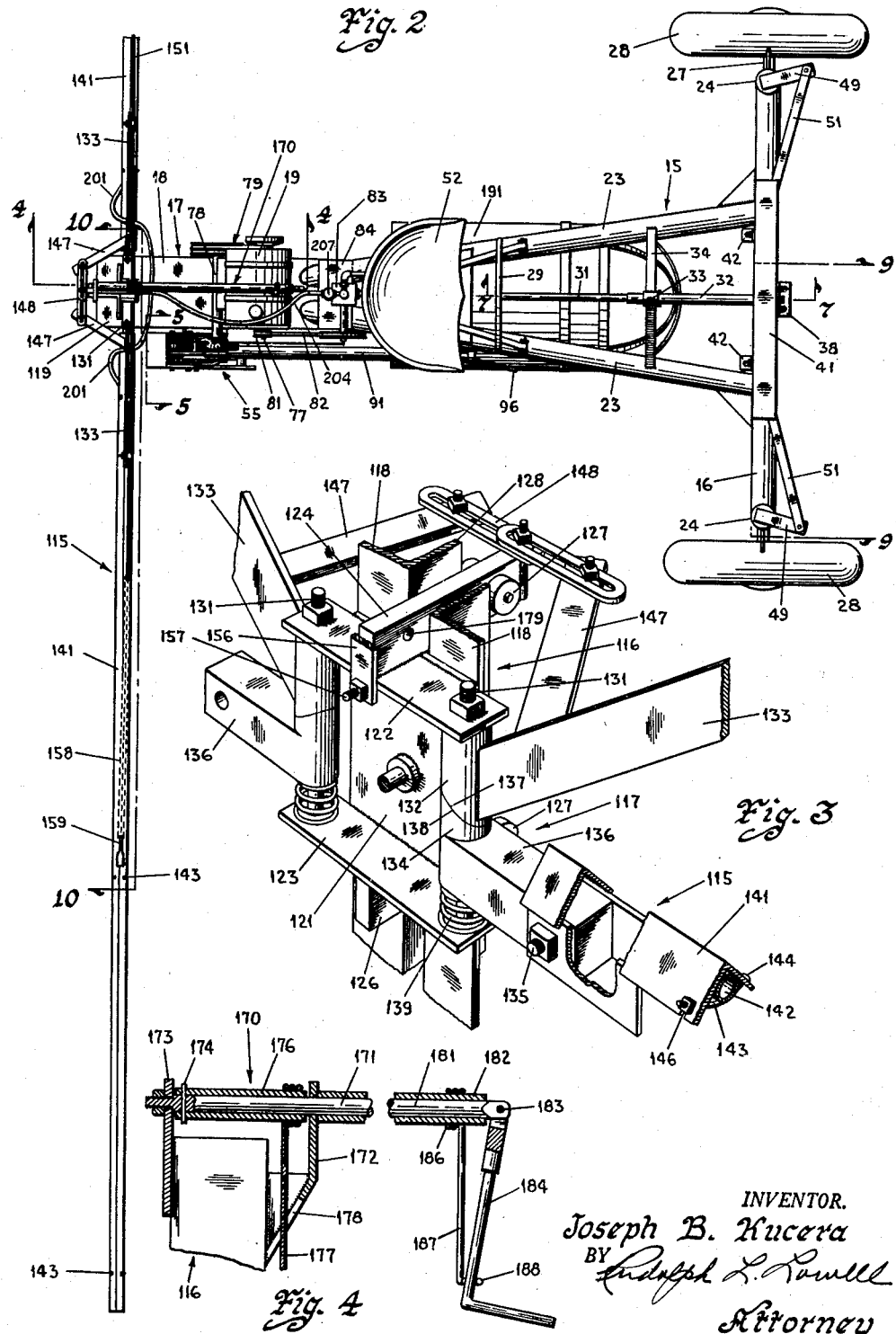

Aug. 4, 1953
J. B. KUCERA
2,647,795
PLANT SPRAYING MACHINE
Filed Aug. 7, 1948
3 Sheets-Sheet 3
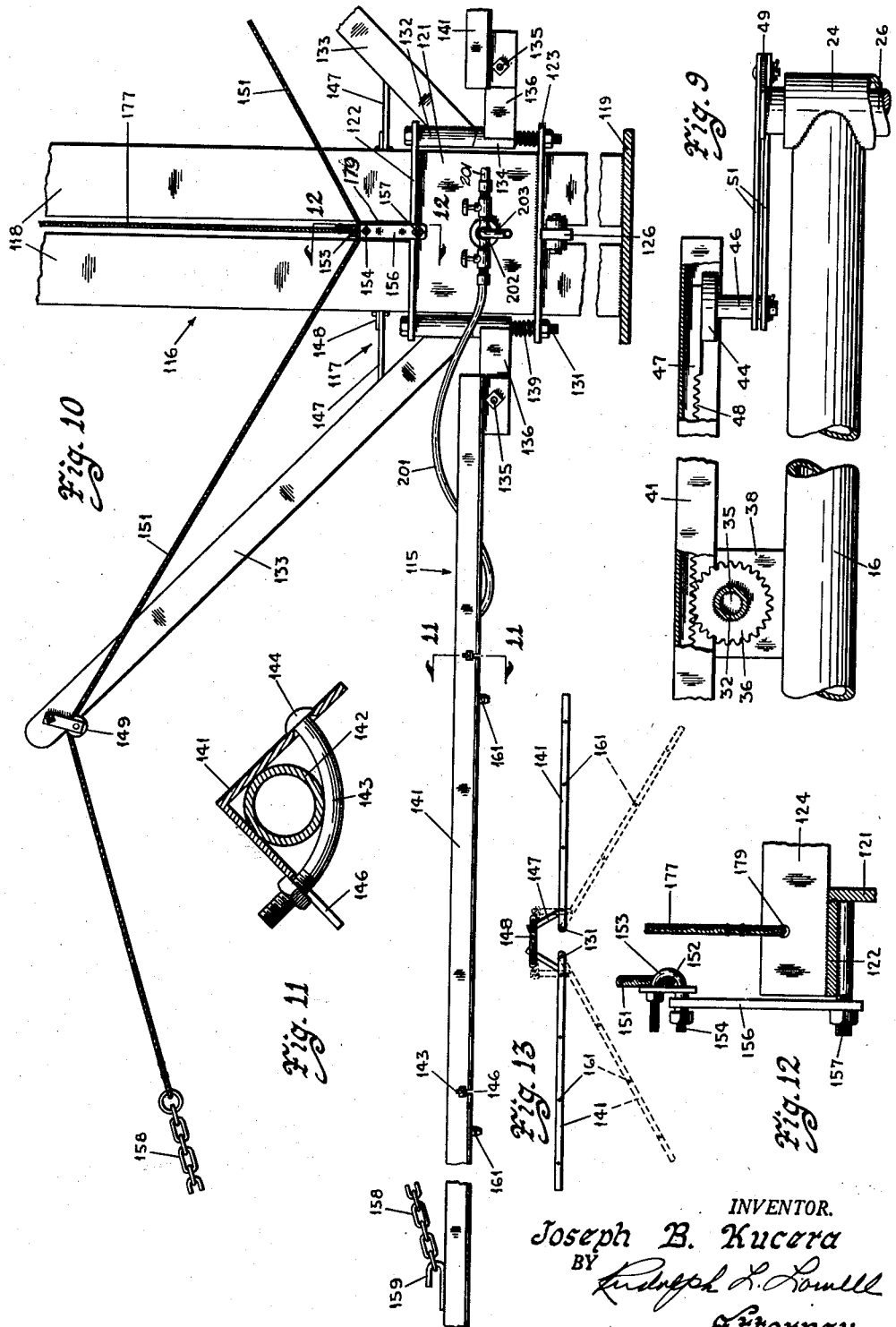
INVENTOR.
Joseph B. Kucera
BY
Rudolph L. Lowell
Attorney

UNITED STATES PATENT OFFICE 2,647,795

PLANT SPRAYING MACHINE

Joseph B. Kucera, Traer, Iowa

Application August 7, 1948, Serial No. 43,086

12 Claims. (Cl. 299—42)

This invention relates generally to plant spraying devices and in particular to a machine for spraying corn and the like.

An object of this invention is to provide an improved plant spraying machine.

Another object of this invention is to provide an improved boom structure for a plant spraying machine.

A further object of this invention is to provide a spraying machine having a boom structure adjustable for up and down or vertical movement, to spray either short or tall corn, and also adjustable horizontally to accommodate corn planted in rows at varying distances apart.

Another object of this invention is to provide a spraying machine having a boom structure comprising two sections supported for relative vertical or up and down movement and connected together by a stabilizing means adapted to maintain the two sections in horizontaly extended positions.

Yet a further object of this invention is to provide a two section boom structure for a spraying machine in which the boom sections are yieldably held in adjusted positions such that on striking an obstruction, a section is movable to pass about the obstruction and, on passing the obstruction, is automatically returned to its original adjusted position.

A feature of this invention is found in the provision of a spraying machine in which a two section boom structure has the inner adjacent ends of the two sections movably supported on a carriage or elevator unit for pivotal movement in up and down and horizontal directions. The carriage unit is guidably supported for adjustable up and down movement on an upright frame carried at the rear end of the machine. The sections are movably connected together in a complementary counterbalancing arrangement by a stabilizing means mounted on the carriage unit for maintenance in an adjusted position and for yieldable movement out of such position on striking an obstruction or the like, with the stabilizing means providing for an automatic return of the sections to their adjusted position when the obstruction has been passed.

Further objects, features and advantages of this invention will become apparent from the following description when taken in connection with the accompanying drawings, in which:

Fig. 1 is a side elevation view of the spraying machine of this invention with parts broken away to more clearly show its construction;

Fig. 2 is a plan view of the machine with the boom structure foreshortened;

Fig. 3 is an enlarged fragmentary perspective detail view of a carriage unit which forms part of the boom structure in the machine;

Fig. 4 is a foreshortened and enlarged sectional view taken on the line 4—4 in Fig. 2, showing the hoist mechanism for the carriage unit in Fig. 3;

Fig. 5 is an enlarged rear elevational view, as seen on the line 5—5 in Fig. 2, showing a part of the system for transmitting power to the machine traction wheel;

Fig. 6 is an enlarged sectional view of another part of the power transmission system taken along the line 6—6 in Fig. 1;

Fig. 7 is an enlarged foreshortened sectional view, as seen on the line 7—7 in Fig. 2, showing a part of the steering apparatus for the machine;

Fig. 8 is a diagrammatic showing of the fluid pressure system in the machine;

Fig. 9 is an enlarged foreshortened detail view of the steering apparatus taken on the line 9—9 in Fig. 2, and having parts broken away for the purpose of clarity;

Fig. 10 is an enlarged sectional view of the boom structure as seen substantially along the line 10—10 in Fig. 2;

Fig. 11 is an enlarged sectional detail view of the boom structure taken on the line 11—11 in Fig. 10;

Fig. 12 is an enlarged sectional detail view of the stabilizing means for the boom sections as seen on the line 12—12 in Fig. 10; and Fig. 13 is a diagrammatic illustration of the boom structure showing changed positions therefor.

With reference to the drawings, the spraying machine of this invention is illustrated in Figs. 1 and 2 as including a main frame, designated generally as 15, comprising a front cross or transverse frame member 16 of a tubular construction, and a rear support member 17 of a right angle shape having a horizontally extended leg 18, which constitutes a mounting base for a power unit 19, and an upright leg 21 which serves as a mounting support for a single rear traction wheel 22. Connected between the front frame member 16 and the forward end of the mounting base 18 are a pair of longitudinally extended tubular frame members 23, inclined upwardly and forwardly from the mounting base and diverging in a forward direction. Arranged at opposite ends of the transverse frame member 16 are a pair of downwardly projected tubular legs 24, each of which has a shaft 26 rotatably supported therein. The lower ends of the shafts 26 are equipped with laterally extended spindles 27 for carrying front steering wheels 28.

The steering mechanism for the front wheels 28 includes a steering wheel 29 (Figs. 1 and 7) carried on a shaft 31 adjustably supported for axial movement within a tube or sleeve member 32 which is rotatably supported in a bearing 33 carried on a frame 34 extended between the longitudinal frame members 23, of the main frame 15, at a position rearwardly of the transverse frame member 16. Axial adjustment of the shaft 31 is maintained by the provision of a pin 30 insertible through aligned holes formed in the shaft and the sleeve 32. Mounted within the front end of the tube or sleeve member 32 is a shaft 35 which carries a pinion gear 36. The forward end 37 of the shaft 35 is rotatable within an upright front bracket member 38 which is secured at 39 to the transverse frame member 16.

An inverted channel member 41 (Figs. 2 and 7) is supported in a spaced relation above the transverse frame member 16 by the front bracket 38 and a pair of oppositely arranged rear brackets 42 which are secured at 43 to the rear side of the transverse frame member 16. The channel 41 constitutes a track member for a pair of rollers 44 (Figs. 1, 7 and 9) mounted on pins 46 which are suitably supported at opposite ends of a rack bar 47, the teeth 48 of which face downwardly for meshing engagement with the top side of the pinion gear 36. Mounted on the upper ends of the shafts 26, for the front leg members 24, are forwardly extended rock arms 49 (Figs. 2 and 9). Links 51 are pivotally connected between the roller pins 46 and the free or forward ends of the rock arms 49.

The steering wheel 29 is located at a position forwardly of a machine operator seat 52 which is carried on the longitudinal frame members 23 at a position adjacent their rear ends. By merely removing the pin 30, the rod 31 is adjustably movable in a forward and rearward direction to a position which can be conveniently reached by the machine operator. On rotation of the steering wheel 29, to in turn provide for a rotation of the pinion gear 36, the rack 47 is guidably moved within the channel track 41, longitudinally of the transverse frame member 16, whereby the front wheel steering shafts 26 are rotated, through the links 51 and rock arms 49, to provide for a steering of the front wheels 28. As shown in Fig. 9, the links 51 are connected with the pivot pins 46 at a position below the channel track 41 to permit a free pivotal movement of the links 51 over the full steering range of the front wheels.

The rear traction wheel 22 is mounted on a shaft 53 (Figs. 1 and 5), which is rotatable in a hub or bearing 54 suitably carried on the inner side of the upright leg 21 of the rear support 17 and has a portion 59 extended outwardly from such leg. A power transmission system, designated generally as 55, includes a rockable frame 56 of a substantially inverted U-shape, having the lower or free ends of its legs 57 and 58 rotatably supported on the extended portion 59 of the rear wheel shaft 53, with the leg 58 being carried on a bearing 61 which fits over the end of the extended shaft portion 59. Supported between the legs 57 and 58 of the U-frame 56, are a pair of vertically spaced shafts 62 and 63, with the shaft 63 being positioned above the shaft 62.

Positioned on the lower shaft 62 are sprockets 64 and 66 and a V-belt pulley 67, with the pulley 67 being arranged between the sprockets 64 and 66. The upper shaft 63 carries a sprocket 68 and a combination V-belt pulley and gear unit 70 including a pair of V-belt pulleys 69 and a gear 71 arranged therebetween. A sprocket 72, mounted on the rear wheel shaft 53, is connected through a sprocket chain 73 with the sprocket 64 on the lower shaft 62. The other sprocket 66 on the lower shaft 62 is connected through a chain 74 with the sprocket 68 on the upper shaft 63. The shaft 63 functions as a drive shaft for driving the rear wheel shaft 53, with the shaft 62 acting as an idler shaft.

The power unit 19 illustrated is a commercially available type combustion engine having an engine shaft 77 (Fig. 2) and a drive shaft 78 connected together through a combination speed reduction and automatic clutch device, indicated generally at 79. One end of the engine shaft 77 carries a V-belt pulley 81 which is connected through a belt 82 with a hydraulic pump 83 forming part of the spraying mechanism of the machine of this invention. The pump 83 (Figs. 1 and 2) is mounted on a base member 84 that extends between the longitudinal frame members 23 at a position rearwardly of the operator's seat 52.

The drive shaft 78 (Figs. 1, 2 and 6) carries a combination unit 86, corresponding to the combination unit 70 on the shaft 63, and includes a pair of V-belt pulleys 87 having a gear member 88 arranged therebetween. V-belts 89 connect the pulleys 87 with the pulleys 69 on the shaft 63.

For a forward advance of the machine, the gears 71 and 88 are out of engagement and the pulleys 69 are connected in a driven relation with the pulleys 87 through the V-belts 89, and the combination unit 86 is rotated in a clockwise direction, as viewed in Fig. 1, to provide for a corresponding rotation of the rear wheel sprocket 72. When the machine is to be reversed, the U-frame 56 is pivotally moved or rocked in a forward direction, or to the right, as viewed in Fig. 1, whereby to move the gear 71 into engagement with the gear 88. On movement of the gear 71 into engagement with the gear 88, the belts 89 are released from frictional engagement with the pulleys 69 and 87. With the gear 88 rotating in a clockwise direction, as viewed in Fig. 1, the gear 71 is rotated in a counter-clockwise direction, as also viewed in Fig. 1, whereby the rear wheel sprocket 72 is driven in a reverse or counter-clockwise direction. A forward or reverse travel of the machine is thus accomplished in response to a forward and rearward pivotal movement of the U-frame 56.

This movement of the frame 56 is accomplished by the provision of means including a longitudinally extended tubular member 91 (Figs. 1 and 2) having its forward end eccentrically mounted at 92 on one of the longitudinal frame members 23 and its rear end equipped with bifurcations 93 for connection at 94 with the legs 57 and 58 of the U-frame 56, as best appears in Fig. 5. The eccentric mounting 92 is equipped with an actuating handle 96, such that when the handle 96 is in its full line position shown in Fig. 1, the gears 71 and 88 are out of engagement, and on movement of the handle 96 to its dotted line position, the frame 56 is rocked to move the gears 71 and 88 into engagement, as illustrated for the dotted line position of the gears in Fig. 6.

The V-belt pulley 67 on the lower or idler shaft 62 constitutes part of a brake system which includes further a V-belt portion 97 (Fig. 5) extended partially about the pulley 67 and having one end 98 attached to a pin 99 extended between the legs 57 and 58 of the U-frame 56, at a position below the idler shaft 62. The other end 101 of the brake belt 97 is attached to the rear end of an actuating rod 102 (Fig. 1) extended through the sleeve member 91 and movably connected with a pivoted handle 103 mounted on the sleeve member 91. On pivotal movement of the handle 103, the brake belt 97 is moved into and out of frictional engagement with the V-pulley 67 to in turn provide for a braking and release of the rear traction wheel 22.

The spray mechanism of the machine, besides the pump 83, includes a boom structure, designated generally as 115 (Figs. 1, 2 and 10) having two opposed laterally extending boom sections or supports 141 mounted on an elevator or carriage unit 117, which is guidably supported for up and down or vertical movement on an upright frame 116. The frame 116 has a pair of spaced upright angle members 118 supported at their lower ends on a rearward extension 119 for the horizontal leg 18 of the angle shaped support member 17. The carriage unit 117 (Figs. 3 and 10) includes a flat upright plate member 121 arranged to the front side of the frame 116 and provided with forwardly extended top and bottom supports 122 and 123, respectively. Extended transversely of the plate 121 and welded at the top and bottom thereof are a pair of spacer blocks 124 and 126, respectively, which extend rearwardly between the spaced angle members 118. Rollers 127 at the rear ends of the spacer blocks 124 and 126 are engageable with the rear edges 128 of the angle members 118 whereby to maintain the plate 121 in an upright position for guidable movement vertically of the frame 116.

Extended between the supports 122 and 123 are a pair of oppositely arranged pivot bolts 131. Since the two boom sections or supports 141 of the boom structure 115, arranged to opposite sides of the machine, are of a like construction and similarly assembled with the carriage 117, only one of such boom sections or supports 141 will be described in detail.

Pivotally mounted about a pivot 131, at a position between the supports 122 and 123, is a hub member 132 for an upwardly and laterally inclined arm 133. A second hub 134, mounted on the pivot 131 at a position below the hub 132, carries a laterally extended arm 136. The adjacent ends of the hubs 132 and 134 are formed with mating cam surfaces 137 and 138, respectively, which are maintained in engagement by the action of a coil spring 139 mounted about the pivot 131 and arranged in compression between the hub 134 and the lower support 123. By virtue of the spring 139 and the action of the cams 137 and 138, the arms 133 and 136 are biased to normal operating positions at which they are in a common plane. A boom member support 141, in the form of an angle iron, is pivoted at 135 on an arm member 136 for up and down pivotal movement and forms a support for a fluid carrying tube or pipe 142 arranged within the apex of the support 141 and secured therein by clamping bolts 143 (Figs. 3 and 11) having their heads 144 extended through one leg of the angle member 141, and their shanks receivable in slots 146 formed in the other leg of the boom support or angle member 141. It is seen, therefore, that the support 141 is pivotally movable in an up and down direction relative to the arm 136 and pivotally movable in a horizontal plane with the arm 136.

The arms 133 are adjustably connected together by the provision of rearward extension members 147 thereon having their rear ends adjustably connected together by adjustment bar or link units, indicated generally as 148, for a purpose to appear later. The free or upper end of each arm 133 (Fig. 10) is provided with a swivel pulley 149 for supporting a cable 151. The cable 151, intermediate its ends, is secured at 152 in a U-clamp member 153 having one leg thereof pivoted at 154 in the upper end of a lever 156, as best shown in Fig. 12. The lower end of the lever 156 is pivoted at 157 on the upper support 122 of the plate member 121. The opposite ends of the cable 151 are connected to the inner ends of chain lengths 158, the outer ends of which are attached to hooks 159 carried on the boom supports 141.

As a result of this assembly of the boom structure, it is seen that the boom supports 141 for the fluid carrying tubes 142 are yieldably held against horizontal movement by the action of the springs 139 and cam surfaces 137 and 138. However, in the event a boom support 141 strikes an obstruction, such as a post or the like, it is capable of concurrent horizontal and up and down pivotal movement so as to pass by the obstruction. When the vehicle and its upstanding frame 116 tilts laterally in either direction due to ground irregularities, by virtue of the cable connection 151 between the boom support members 141, and the pivoted support of the U-clamp 153 on the pivoted lever 156, the upward swinging movement of an arm support 133 at one side of the machine permits a downward swinging movement of the arm support 133 at the opposite side of the machine. Likewise a downward pivotal movement of one arm support 133 results in an upward pivotal movement of the other arm support 133. This results in one of the pulleys 149 running freely on the flexible cable 151 which tends to remain stationary due to pivoted lever 156 remaining in a vertical position. The U-clamp 153 and pivoted lever 156 thus act as a balancing or stabilizing means for maintaining the boom supports 141 in horizontally extended positions, notwithstanding undesired lateral tilting of the vehicle, and the springs 139 and cam surfaces 137 and 138 cooperate to maintain the boom supports 141 in the vertical planes of the arms 133.

As previously mentioned, the arms 133 are adjustably connected for pivotal movement toward and away from each other through the extensions 147 and the adjustment bar or link units 148. Thus, with reference to Fig. 10, there are illustrated spray nozzles 161 connected with the fluid carrying member or spray pipe 142 and spaced longitudinally thereof. In the spraying of plants, arranged in rows such as corn, the distance between rows in different fields may vary. By initially spacing the nozzles 161 to accommodate the widest anticipated distance between the rows, the boom supports 141 are pivotally moved forwardly to adjusted positions, as indicated for one position in dotted lines in Fig. 13, whereby to uniformly decrease the distance between the nozzles transversely of the machine. Spraying of plants in rows at varying distances apart is thus readily accomplished by adjustable movement of the arms 133.

It will be noted that on adjustment of the arms 133, the boom supports 141 are movable therewith and are maintained in the vertical plane of the arms 133 at any adjusted position of the arms 133 by the action of the springs 139 and cam surfaces 137 and 138. Further, the cable connection 152 permits a following action of the boom supports 141 relative to the arms 133 and in conjunction with the pivot lever 156 maintains the boom supports 141 in horizontally extended positions.

The adjustment and operation of the boom supports 141 is the same for all elevated positions of the carriage unit 117. A raising and lowering of the carriage unit is accomplished by a hoist mechanism, designated generally as 170 (Figs. 1 and 4), and includes a shaft 171 extending longitudinally of the machine and rotatably carried in upright brackets 172 and 173 provided on the frame 116. Mounted in a fixed position on the shaft 171, and between the brackets 172 and 173, through a pin connection 174, is a tubular drum member 176. Windable on the drum 176 is a cable 177 which, from the drum 176 extends downwardly through an opening 178, formed in the front bracket 172, for attachment of its lower end to the forward end of the spacer block 124 at 179 (Figs. 3, 10 and 12). The shaft 171 extends forwardly from the front bracket 172 and on its front extension 181 carries a tubular sleeve 182. Pivoted at 183 on the shaft extension 181 is an actuating handle or crank 184. To raise or lower the carriage unit 117, therefore, it is only necessary to manipulate the crank 184.

In order to hold the carriage unit 117 in an elevated position, there is mounted about the tubular sleeve 182 a coil spring 186 having a downwardly extended straight end portion 187 which terminates in a loop member 188 adapted to receive the crank 184 therein. The loop 188 functions as a stop to prevent rotation of the crank 184 in one direction, corresponding to a downward movement of the carriage unit 117. However, by virtue of the loop 188 being formed as a part of the spring 186, the carriage unit 117 is yieldably maintained in an adjusted position. As a result, during a travel of the machine, the depending spring portion 187 functions as a resilient crank engaging detent to absorb road shock transmitted to the boom sections or supports 141 of the boom structure. The spring 186 thus acts as a combination yieldable stop for the crank 184, and as a shock absorber for the boom supports 141. It will be also noted that the springs 139 supplement the shock absorbing action of the spring 186.

A suitable spraying fluid is supplied under pressure to the nozzles 161 from a fluid reservoir 191 (Fig. 1) suspended from the longitudinal frame members 20 at a position substantially below the machine operator seat 52, so that the top side of the reservoir 191 may be used as a foot support by the machine operator.

The pump 88 (Fig. 8) has its inlet 192 fluid connected with the reservoir 191 through pipes 193 and 194 which are connected through a T-connection 196. The pump outlet 197 is provided with a bypass valve unit 198 connected with the reservoir 191 through a bypass line or pipe 199.

The fluid carrying tubes 142, in the boom supports 141, have their inner adjacent ends equipped with flexible connections 201 (Figs. 2 and 10) which in turn are connected with a valve structure 202, mounted on the upright plate member 121 of the carriage unit 117 and having a single inlet line 203 connected with the bypass valve unit 198 through a flexible connection 204 and a pipe section 206. The pipe section 206, pipe 194 and the pipe 193 are provided with valves 207, 208 and 209, respectively. When fluid under pressure is to be supplied to the nozzles 161, the valve 209 is closed and the valves 207 and 208 are opened, with the bypass valve unit 198 acting to limit the maximum pressure of the fluid supplied to the nozzles. When fluid is to be taken into the reservoir 191 from a barrel or the like, the valves 207 and 208 are closed and the valve 209 is opened. By attaching a flexible connection to the pipe 193 for insertion into the barrel of fluid, the fluid enters the pump through the pipe 193 and is then discharged into the reservoir 191 through the bypass valve unit 198 and pipe 199. When the reservoir is filled, the valve 209 is closed and the valves 207 and 208 are again opened.

From a consideration of the above description, it is seen that the invention provides a spraying machine of a simple and compact construction, which is fully operated by the machine operator while in a seated position. The boom structure 115 is adjustable in an up and down or vertical direction to provide for the spraying of corn and the like of varying heights, with the boom supports 141 being flexibly or yieldably mounted to move in response to the striking of an obstruction or the like, and then through the stabilizing action of the pivoted clamp 152 and pivot lever 156, automatically returned to horizontally extended positions. Further, the boom supports 141, through the action of the springs 139 and cam surfaces 137 and 138, are always yieldably maintained in their adjusted positions, as determined by the adjustment of the bar or link units 148. Further, the machine is readily maneuverable and under full control of the machine operator at all times.

Although the invention has been described with respect to a preferred embodiment thereof, it is to be understood that it is not to be so limited since changes can be made therein which are within the full intended scope of this invention, as defined by the appended claims.

I claim:

1. In a spraying machine including a portable frame, a boom structure including an upright frame adjacent one end of said portable frame, a carriage member supported for adjustable vertical movement on said upright frame, means for raising and lowering said carriage member to an adjusted position, a pair of boom sections extended laterally in opposite directions from said carriage member, means on said carriage member for pivotally supporting the inner ends of said boom sections thereon for swinging movement in a horizontal plane, separate means on said carriage member spaced laterally outwardly from said first mentioned pivotal support means for pivotally supporting the inner ends of said boom sections for independent swinging movement in a vertical plane, and stabilizing means connected between said boom sections and carriage member to provide for a relative vertical pivotal movement of said boom sections to maintain said boom sections in horizontally extended positions.

2. In a spraying machine including a portable frame, a boom structure including an upright frame mounted on said portable frame, a carriage member supported for vertical movement on said upright frame, means for vertically moving said carriage member, means for yieldably holding said carriage member in adjusted position on said upright frame, a pair of oppositely arranged boom sections movably mounted on said carriage member for pivotal movement in horizontal and vertical planes, means on said carriage member for adjusting said boom sections in the horizontal plane of movement therefor, and means on said carriage member for yieldably and independently maintaining the boom sections in said horizontally adjusted positions.

3. In a spraying machine having a portable frame, a boom structure including an upright frame mounted on said portable frame, a carriage member mounted for vertical movement on said upright frame, a pair of oppositely arranged boom sections movably mounted on said carriage member and extending transversely of said portable frame, means supporting the inner adjacent ends of said boom sections on said carriage member for pivotal up and down and horizontal movement, means for yieldably maintaining said boom sections in horizontally adjusted positions therefor, means for yieldably maintaining said boom sections in said horizontally extended positions including a flexible member having its opposite ends connected with said boom sections intermediate the ends thereof, means pivoted on said carriage member for pivotal movement transversely of said portable frame, and means for securing the intermediate portion of said flexible member to said pivoted means.

4. In a spraying machine having a portable frame, a boom structure including an upright frame mounted adjacent one end of said portable frame, a carriage member supported on said upright frame for vertical movement thereon, a pair of oppositely arranged boom sections mounted on said carriage member, means for raising and lowering said carriage member including a drum rotatably supported adjacent the upper end of said upright frame, means for rotating said drum, a flexible member windable on said drum and having one end attached to said carriage member, and a resilient stop means on said upright frame adapted to releasably engage said drum rotating means to yieldably hold said carriage member in vertically adjusted position on said upright frame.

5. In a spraying machine having a portable frame, a boom structure including an upright frame carried on said portable frame, a carriage member adjustably supported for vertical movement on said upright frame, a pair of oppositely arranged boom sections pivotally supported at their inner adjacent ends on said carriage member for independent swinging movement in horizontal and vertical planes, means on said carriage member for yieldably maintaining said boom sections in horizontally adjusted positions, and means on said carriage member for independently adjusting the positions of said boom sections in their horizontal plane of swinging movement.

6. In a spraying machine having a portable frame having an upright frame member thereon, a boom structure including a boom supporting carriage movably supported on said upright frame section for vertical movement thereon, a pair of oppositely disposed transversely extended boom sections having their inner adjacent ends pivotally mounted at spaced localities on said carriage to provide for independent vertical and horizontal swinging movement of said boom sections on said carriage, and flexible stabilizing means connected to said boom sections and rigidly connected to said carriage to maintain said boom sections in horizontally extended positions when said frame is tilted laterally.

7. In a spraying apparatus adapted to be mounted on a vehicle, a carriage member, means mounting said carriage member for vertical movement on said vehicle, means including a resilient detent for yieldably supporting said carriage member at a selected height, a spray boom, and means mounting said spray boom on said carriage member.

8. In a spraying apparatus adapted to be mounted on a vehicle, a pair of spray boom sections mounted for vertical swinging movement on said vehicle, a boom suspension member mounted above each boom section, a pivotally movable anchor mounted between said boom suspension members, and a cable-like support element having its opposite outer ends respectively attached to said boom sections and having intermediate portions anti-frictionally engaging said boom suspension members and secured substantially centrally to said movable anchor to provide equalized balanced support for said boom sections on said vehicle.

9. In a spraying apparatus adapted to be mounted on a vehicle, a pair of spray boom sections adapted to be mounted for vertical swinging movement on said vehicle, a boom suspension member mounted above each boom section, a movable anchor mounted between said boom suspension members, and a cable-like support element having its outer ends attached to said boom sections and an intermediate portion passing over said boom suspension members to engage said movable anchor to provide equalized balanced support for said boom sections on said vehicle, said movable anchor comprising a link pivoted on said vehicle at one end and engaging said support element at its other end.

10. In a spraying apparatus adapted to be mounted on a frame, a spray boom having an inner hub portion pivotally mounted on said frame, boom suspension means including a laterally extending arm having an inner hub portion pivotally mounted on said frame above said spray boom hub for supporting said boom, said boom and arm hub portions having cooperatively engaging spring pressed cam surfaces to yieldably hold said boom beneath said boom suspension means arm in co-planar relation thereto.

11. In a spraying apparatus, a frame including a vertically disposed pin, a spray boom pivotally mounted on said pin, boom suspension means mounted on said pin adjacent said spray boom, cooperating cam surfaces on said boom and said suspension means, and a resilient element urging said surfaces together whereby said boom is yieldably held beneath said suspension means.

12. In a spraying apparatus for mounting on a vehicle, the combination of an upstanding frame member having a carriage supported for vertical movement thereon, means for vertically moving said carriage on said frame member, a pair of spray boom section arms having angularly extending extensions at their inner ends mounted in opposing endwise relation and pivoted on said carriage for horizontal swinging movement with respect thereto, a plurality of spray nozzles mounted in spaced relation on said arms, and means comprising a plurality of relatively movable cooperating links secured at their opposite ends to said carriage and to said boom arm extensions respectively for angularly adjusting said boom arms relative to each other and to the longitudinal center line of said vehicle, thereby to vary proportionately the separation of said nozzles from each other in a direction normal to said center line.

JOSEPH B. KUCERA.

References Cited in the file of this patent

UNITED STATES PATENTS

| Number | Name | Date |
|---|---|---|
| 648,414 | Kenison | May 1, 1900 |
| 1,634,701 | Williams | July 5, 1927 |
| 1,970,984 | Smith | Aug. 21, 1934 |
| 2,221,433 | Pitner | Nov. 12, 1940 |
| 2,254,359 | Frudden et al. | Sept. 2, 1941 |
| 2,273,344 | Black et al. | Feb. 17, 1942 |
| 2,275,302 | Magnuson | Mar. 3, 1942 |
| 2,305,913 | Troyer | Dec. 22, 1942 |
| 2,381,649 | Dalton | Aug. 7, 1945 |
| 2,532,996 | Clark et al. | Dec. 5, 1950 |
| 2,539,288 | Van Horn | Jan. 23, 1951 |

FOREIGN PATENTS

| Number | Country | Date |
|---|---|---|
| 591,894 | Great Britain | Sept. 2, 1947 |
| 594,269 | Great Britain | Nov. 6, 1947 |